(12) United States Patent
Huynh (10) Patent No.: US 8,827,443 B2
(45) Date of Patent: Sep. 9, 2014

(54) EYEWEAR

(76) Inventor: Loc Huynh, San Dimas, CA (US)

( * ) Notice: Subject to any disclaimer, the term of this patent is extended or adjusted under 35 U.S.C. 154(b) by 24 days.

(21) Appl. No.: 13/424,757

(22) Filed: Mar. 20, 2012

(65) Prior Publication Data

US 2013/0250230 A1 Sep. 26, 2013

(51) Int. Cl.
*G02C 9/02* (2006.01)
*G02C 5/12* (2006.01)

(52) U.S. Cl.
USPC .............................. 351/59; 351/136

(58) Field of Classification Search
USPC .................... 351/59, 124, 136, 156
See application file for complete search history.

(56) References Cited

U.S. PATENT DOCUMENTS

| | | | |
|---|---|---|---|
| 6,253,388 B1 * | 7/2001 | Lando | 2/445 |
| 6,611,959 B1 * | 9/2003 | Lando | 2/10 |
| 8,025,396 B1 * | 9/2011 | Power | 351/124 |

FOREIGN PATENT DOCUMENTS

| | | |
|---|---|---|
| DE | 202006003118 U1 | 6/2006 |
| ES | 1054274 U | 7/2003 |
| TW | 398631 U | 7/2000 |
| TW | M290255 U | 5/2006 |
| TW | M296990 U | 9/2006 |

OTHER PUBLICATIONS http://www.clicgoggles.com/index.html (1 page), Dec. 2010.

* cited by examiner

*Primary Examiner* — Mohammed Hasan
*Assistant Examiner* — Mustak Choudhury
(74) *Attorney, Agent, or Firm* — Tutunjian & Bitetto, P.C.

(57) ABSTRACT

Eyewear having a lens retraction system allows the user to maintain the eyewear on their head without having to move the frames from their ordinary wearing position, yet allows the lenses to be selectively moved from an in use position to a stowed position away from the user's eyes. The retraction mechanism is configured into the side frames of the eyewear and allows the lens assemblies to be slidably or pivotally moved into the stowed position on the side of the wearer's head.

14 Claims, 9 Drawing Sheets

FIG. 13 ved angularly repositioned such that the lenses rest on the user's
EYEWEAR

BACKGROUND

1. Technical Field

The present invention relates to eyewear. More particularly, it relates to eyewear with a retractable lens system.

2. Description of the Related Art

Many eyeglasses, and particularly reading and/or sunglasses are often put on and off during the course of a day or an outing depending on the requisite need. For example, sunglasses are generally worn to enable the user to see in high sunlight conditions. Thus, when the wearer enters a shady area, they will remove the glasses from their eyes by either removing them from their face, or alternatively they are often angularly repositioned such that the lenses rest on the user's head. In the case of reading glasses, they are obviously not needed all the time and the user will generally remove the same from their face when not in use. Alternatively, the user can place their reading glasses on their head, or attached to a chain, etc.

SUMMARY OF THE INVENTION

It is an aspect of the present invention to provide eyewear where the lenses may be retracted from the use position (i.e., in front of the wearer's eyes) to a stowed or not in use position (i.e., lenses are removed from being in front of the wearer's eyes), without requiring the user to otherwise adjust or move the eyewear frame position on their head.

These and other aspects of the invention are achieved in accordance with one implementation where the eyewear includes frame members and a lens assembly attached to each of the frame members. The lens assemblies each having a central portion configured to be releasably connected with the opposing lens assembly to form the nose bridge. At least one retraction mechanism couples at least one of the lens assemblies to a corresponding frame member. The at least one retraction mechanism is configured to enable the attached lens assembly to be retracted from an in use position to a stowed position on the side of the wearer's head when separated at the releasable connection forming the nose bridge.

According to another aspect of the invention, the eyewear includes left and right side frame members, left and right lens assemblies retractably attached to the respective left and right frame members and each having a central portion releasably connected to each other to form a nose bridge, and a left retraction mechanism coupling the left lens assembly to the left frame member and a right retraction mechanism coupling the right lens assembly to the right frame member. The retraction mechanisms are configured to enable the left and right lens assemblies to be independently retracted from an in use position to a stowed position on the side of the wearer's head when separated at the releasable connection forming the nose bridge.

Other objects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

Figure 1:
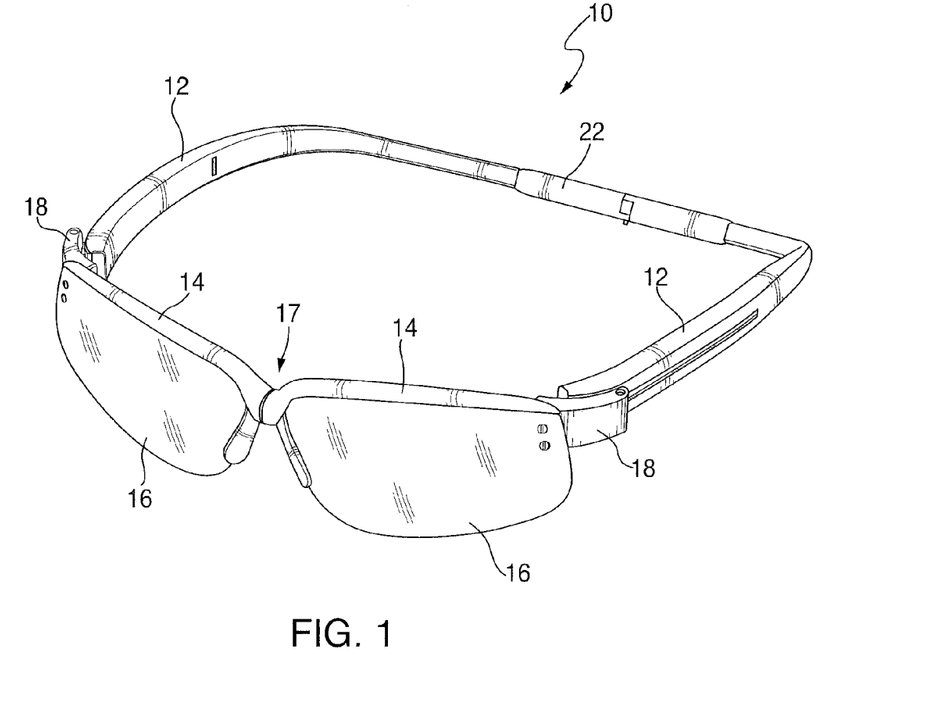
FIG. 1 is perspective view of the eyewear according to a first implementation of the invention.

FIG. 1 shows the eyewear 10 according to an implementation of the present principles. Eyewear 10 includes side frame members 12, lens assemblies made up of lens frames 14, lenses 16 and a nose bridge 17 and rear frame member 22 connecting the side frame members 12 around the back of the wearer's head.

In this implementation, eyewear 10 includes a lens retraction mechanism made up of the following parts: connecting member 18 that connects the corresponding lens assembly to the side frame member, a longitudinal slot 20 within the side frame member 12 and a sliding element 24 (See FIGS. 2-5).

Figure 2:
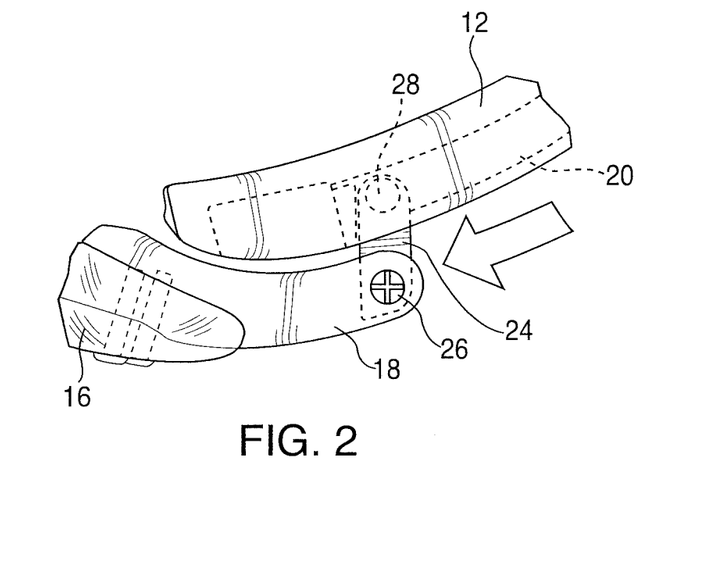
FIGS. 2 and 3 are close up views of the retraction mechanism of the eyewear according to one implementation of the invention.
Figure 3:
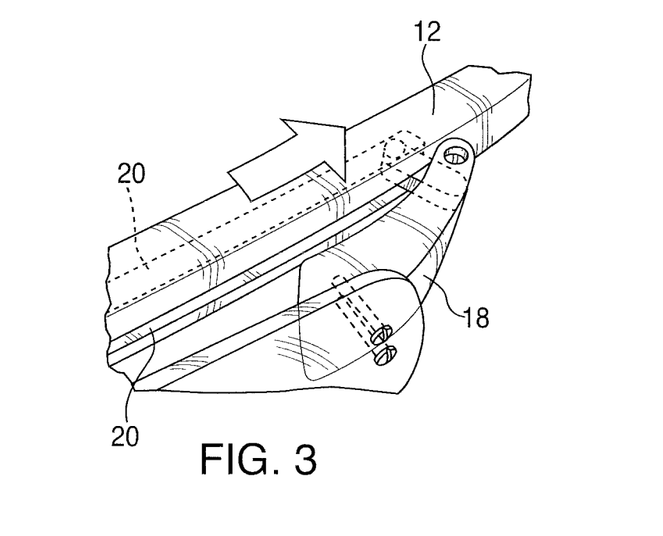

FIGS. 2 and 3 show one implementation of the retraction mechanism according to the present principles. The sliding element 24 is connected at one end (26) to the lens connecting member 18 and has an opposing end 28 disposed within the side frame member 12. As will be prevalent in the following discussion, the cross sectional area of the longitudinal slot 20 is larger within the frame member 12 than the exposed slot on the exterior of the frame member. As such, the opposing end 28 of the sliding element 24 is configured to be larger than the exterior slot such that the sliding element 24 cannot come out of the slot 20 and may only slide within the same. In this implementation, the sliding configuration of sliding element 24 is frictional in nature such that only a slight amount of force is required to slide the lens assembly along the slot 12. Here, the internal frictional engagement between the opposing end 28 of the sliding element 24 and the internal surfaces of the slot 12 is such that there is no free sliding or unintended sliding of connection element 24 without user intervention.

Figure 8:
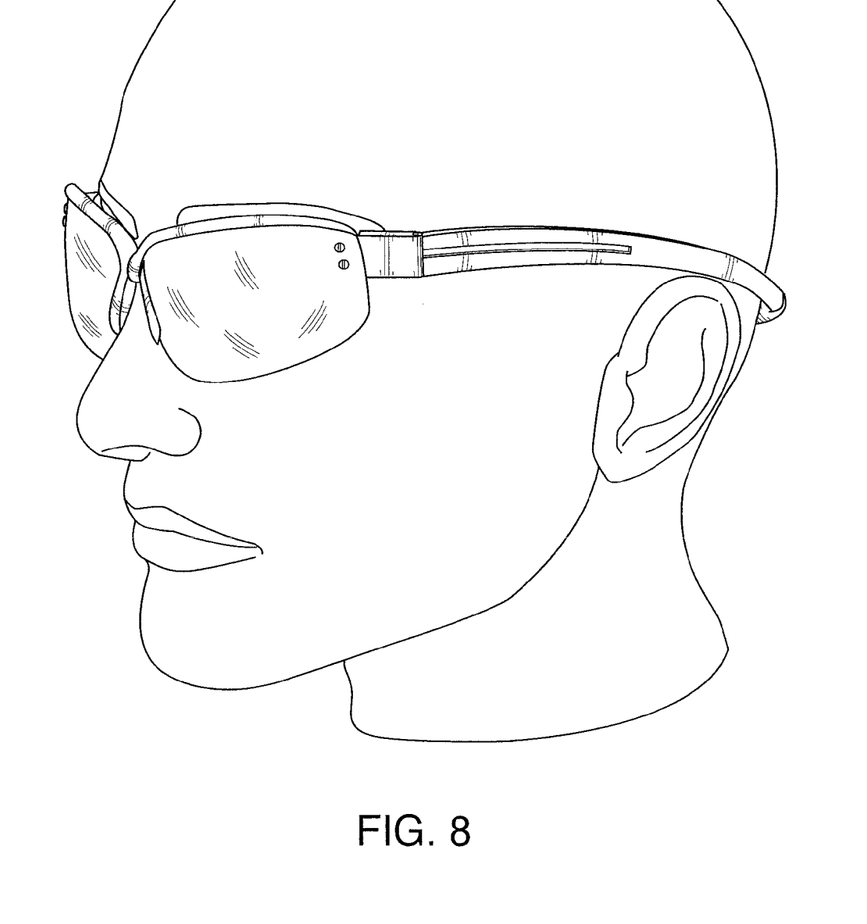
FIG. 8 is a perspective view of the eyewear of the first implementation shown in the adorned position on the wearer's head.
Figure 9:
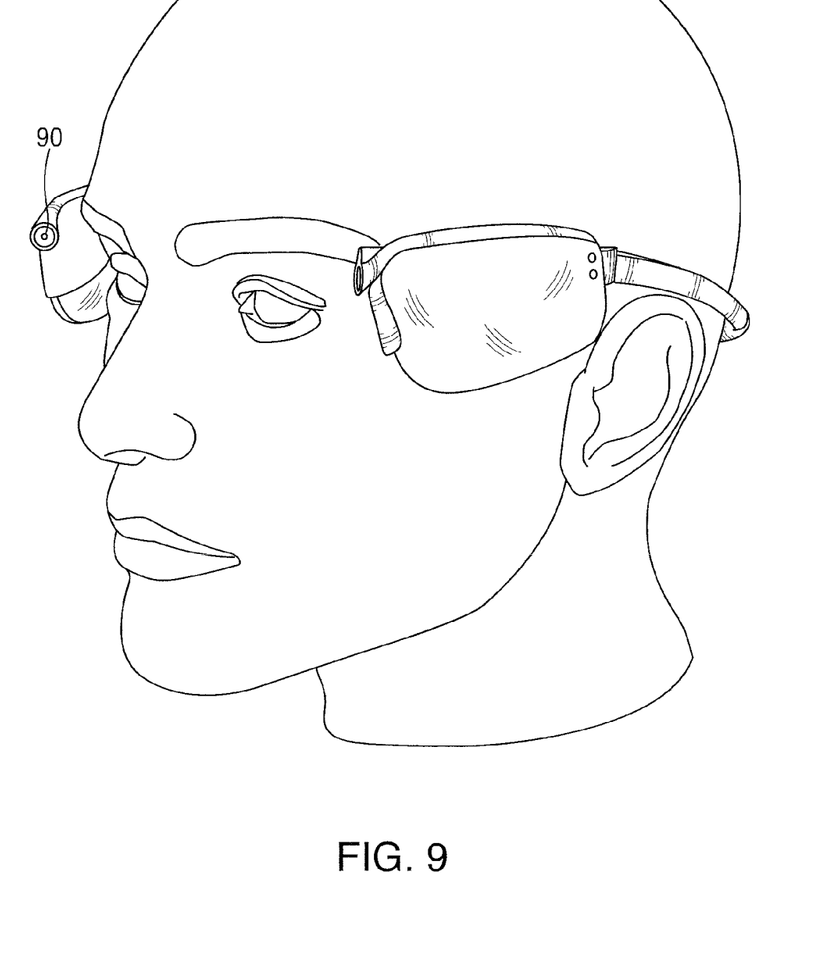
FIG. 9 is a perspective view of the eyewear of the first implementation shown in the stowed position alongside of the wearer's head.

The nose bridge 17 is configured to be separated such that each of the left and right lens assemblies can be moved independent of the other. Thus, as shown in FIGS. 2 and 3, the connecting member 18 (and attached lens assembly) can be slid from the wearing position (FIG. 2) to a stowed position (FIG. 3), without requiring a repositioning of the side frame members on the wearer's head. FIGS. 8 and 9 show the wearing position and the stowed position, respectively, according to this implementation.

Those of skill in the art will appreciate that the nose bridge connection 17 can be formed by any known means, and in the present example, opposing magnets 90 can be implemented for the releasable secure connection of the lens assemblies. Although a magnetic connection is preferred, those of skill in the art will appreciate that the connection between lens assemblies that forms the nose bridge 17 can also be formed from, for example, a mating snap or clip like structure, or even a hook and loop releasable connection.

Figure 4:
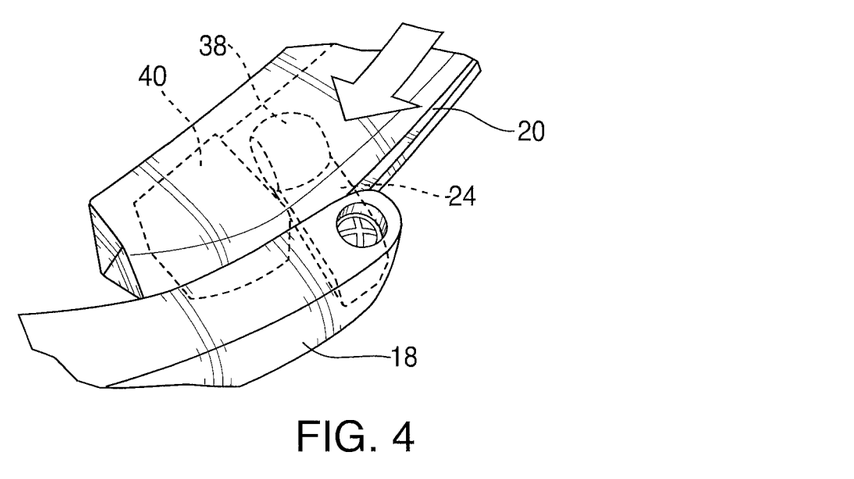
FIGS. 4 and 5 are close up views of the retraction mechanism of the eyewear according to another implementation of the invention.
Figure 5:
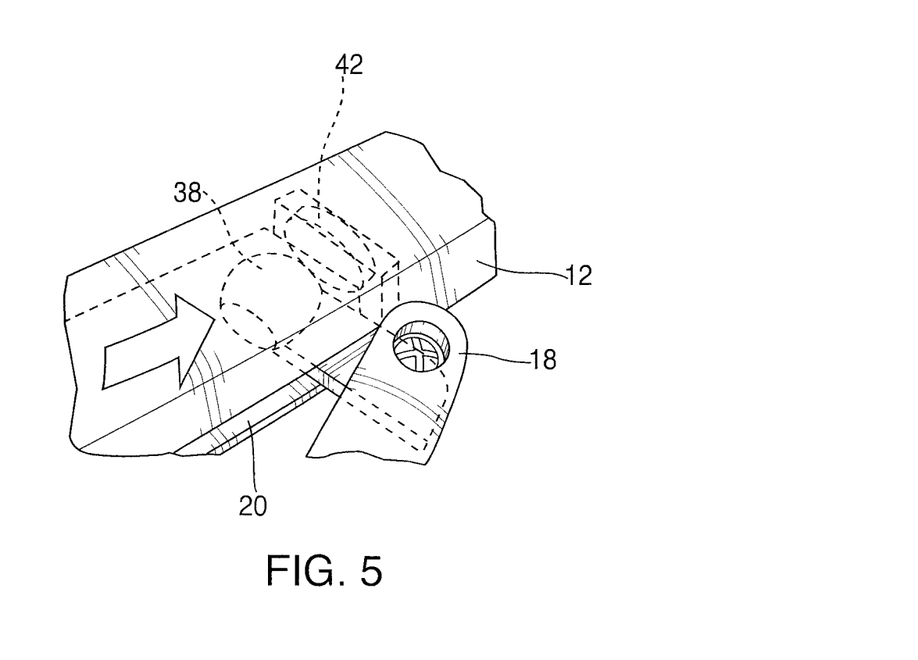

FIGS. 4 and 5 show another implementation of the retraction mechanism according to the present principles. Here, the sliding element 24 is configured to include some magnetic properties in end 38 disposed within the slot 20. Magnets 40 and 42 are added to the front and rear ends of the slot, respectively, so as to provide the sliding member 24 with the ability to be magnetically retained in the worn position and the stowed position. This will prevent the unexpected or unintentional sliding of the lens assemblies from the user selected position. In this configuration, the frictional engagement between the end 38 and the internal surfaces of the slot 20 can be lessened, and arguably eliminated, to assist in the reduction of time in manufacturing and constructing the eyewear of the invention. Although two implementations have been shown, it is to be appreciated that other implementations of the sliding retraction mechanism of the present invention may be implemented without departing from the spirit of the same. For example, it is contemplated herein that the frame members may include an internal linear bearing or the like such that the opposing end of the sliding element engages the same and is slidable along the frame member according to the movement allowed by such internal bearing system.

Figure 6:
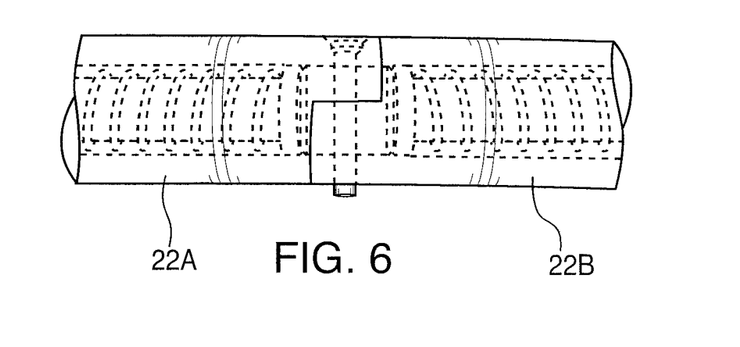
FIGS. 6 and 7 are close up views of the rear frame connection of the eyewear according to an implementation of the invention.
Figure 7:
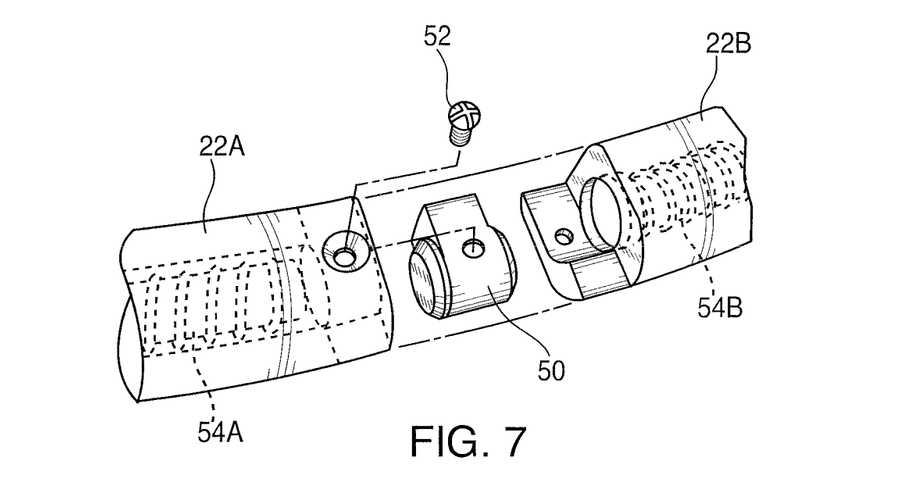

FIGS. 6 and 7 show the rear frame member 22 according to one implementation of the same. Here, there are internal springs 22a and 22b to the frame member 22 which allows the user to flex the rear of the eyewear outward and enable them to "wrap" the eyewear around their head and connect the corresponding lens assemblies as the nose bridge connection 17. The rear frame member 22 is connected by a connection member 50 and corresponding fastener 52. In accordance with one implementation, the connection member 50 is weighted to provide balance to the eyewear when being worn by the user. This balancing of the rear of the eyewear assists the user when the moving the lens assemblies from the worn position to the stowed position on the side of their head. Those of skill in the art will appreciate that the amount of balance weighting provided by the connection member 50 may be varied as desired for a particular design. For example, some factors involved in the determining the weight of the connection member could be the materials use for the frame members 12, the materials used for the lenses 16 and/or lens frames 14, etc. Examples of such materials can include plastics, metals, combination alloys and/or any combination of the same suitable for manufacturing into eyewear. The lenses can also be any known material and may include, for example, CR-39 plastics, Polycarbonates, glass, or the like. In each instance or implementation the weight of the materials making up the eyewear is a factor considered in the selection of the weight for the connection member 50.

FIG. 8 shows a plan view of the eyewear 10 in the "in use" position on a wearer's head. FIG. 9 shows a plan view of the eyewear 10 with the lens assemblies in the "stowed" position retained by the side frame members on the side of the wearer's head.

Figure 10:
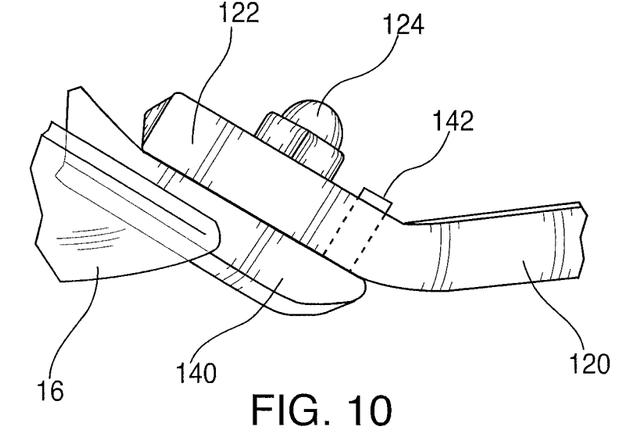
FIGS. 10 and 11 are close up views of the retraction mechanism of the eyewear according to yet another implementation of the invention.
Figure 11:
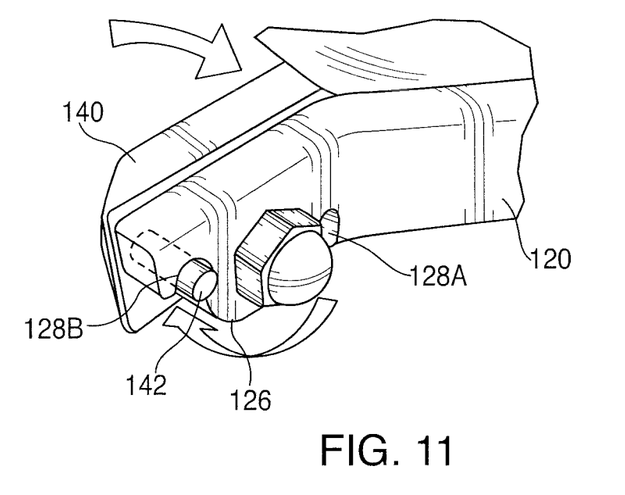

FIGS. 10-13 show another implementation of the eyewear having a lens retraction system where the lens assemblies are pivotally mounted to the ends of the frame members 120. As shown in FIGS. 10 and 11 the frame member 120 includes an angled end 122 to which the lens connection member 140 is pivotally connected 124. The angled end 122 of the frame member 120 includes a pivot guide 126 and detents or receiving slots 128a and 128b on opposite ends of the pivot guide 126. The connecting member 140 includes a pivot pin 142 that is configured to travel along the pivot guide 126 and be received by the detents 128 depending on the operable position of the lens assemblies.

Figure 12:
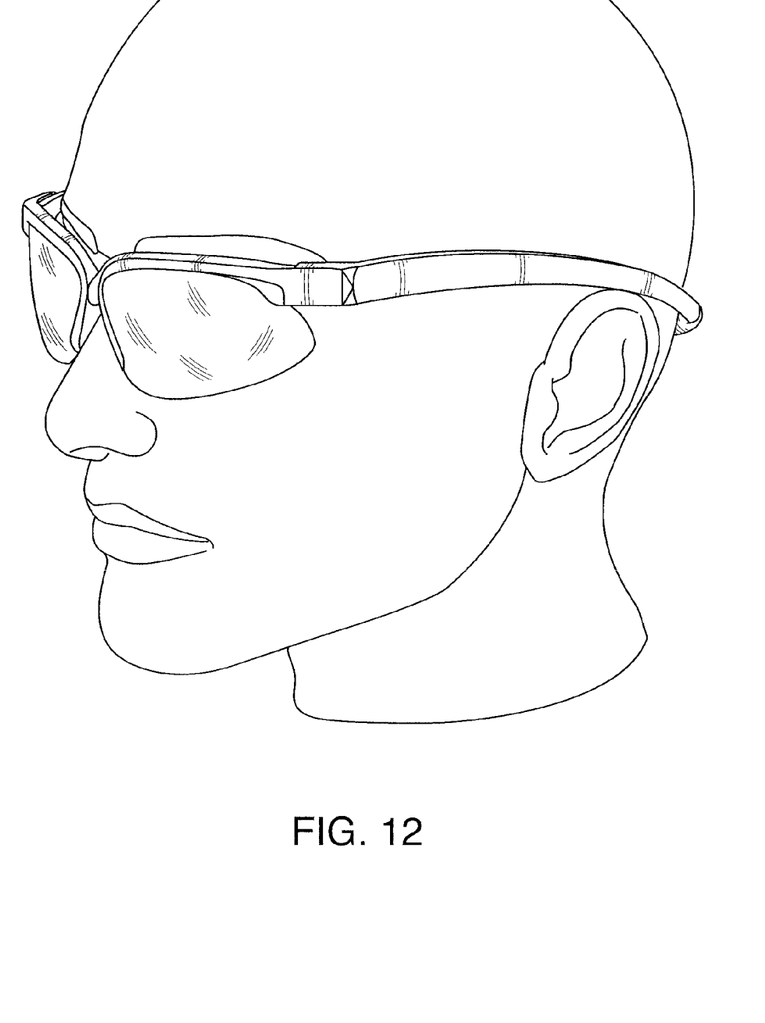
FIG. 12 is a perspective view of the eyewear of a second implementation shown in the adorned position on the wearer's head.
Figure 13:
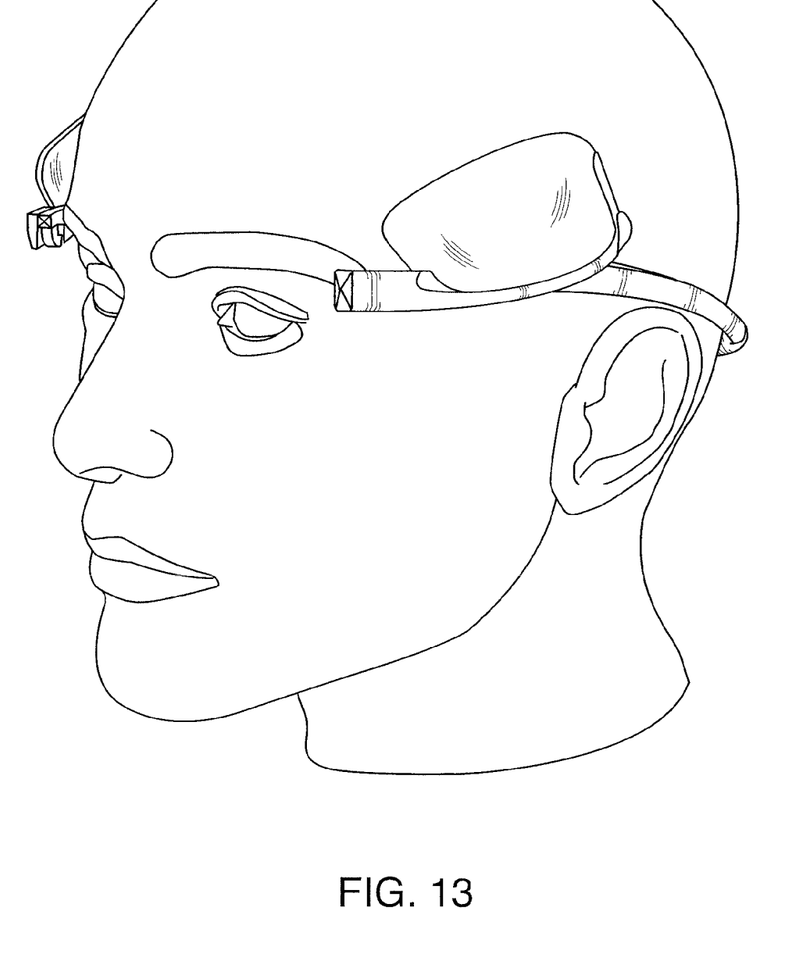
FIG. 13 is a perspective view of the eyewear of the second implementation show in the stowed position alongside the wearer's head.

FIGS. 10 and 12 shows the eyewear in the "in use" position with the lens assemblies positioned in front of the user's eyes. When the user decides to stow the lens assemblies, they are independently pivoted up to 180 degrees such they are then "stowed" on the side of the user's head (FIGS. 11 and 13). Those of skill in the art will appreciate that the amount of rotation of the lens assemblies can be a matter of design choice and can be less or more than 180 degrees. For example, a user may find that they only need to temporarily retract the lens assembly from their eye and as such, may only rotate the same 45 degrees.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

What is claimed is:

1. Eyewear comprising:
    side frame members configured to engage a wearer's head, said side frame members engaging the wearer's head such that they pass between the wearer's ears and head;
    a lens assembly attached to each of the side frame members, said lens assemblies each having a central portion configured to be releasably connected with the opposing lens assembly to form a nose bridge;
    at least one retraction mechanism coupling at least one of the lens assemblies to a corresponding side frame member and being integrated into said corresponding side frame member, said at least one retraction mechanism enabling the attached lens assembly to be slidably retracted along an exterior surface of the corresponding side frame member from an in use position to a stowed position on the side of the wearer's head when separated at the releasable connection forming the nose bridge.

2. The eyewear of claim 1, wherein the at least one retraction mechanism comprises:
    a connecting member fixedly attached to the lens on one end and having an opposing end;
    a sliding element pivotally attached at one end to the opposing end of the connecting member and having a distal end;

a longitudinal slot formed in the outer surface of the side frame member and being configured to receive the distal end of the sliding element which is configured such that said distal end cannot be withdrawn from the slot.

3. The eyewear of claim 1, further comprising a rear frame member connecting the left side and right side frame members such that the eyewear completely surrounds a wearer's head when in the worn in the user position.

4. The eyewear of claim 3, wherein the rear frame member further comprises
   a connection member having a weight configured to balance the eyewear on the users head, particularly when the lenses are in the stowed position; and
   a spring system configured to enable the user to flex the connected left and right side frame members outward and then inward thereby enabling the wearer to adorn the eyewear by wrapping the same around their head and connecting them at the point of the nose bridge.

5. The eyewear of claim 1, wherein said at least one retraction mechanism comprises:
   a pivot connection between the lens assembly and the connected side frame member;
   a pivot guide configured into the side frame member; and
   a pivot pin disposed on the frame assembly and configured to ride along the pivot guide so as to enable the rotation of the frame assembly about the pivot connection.

6. The eyewear of claim 5, wherein the pivot guide enables the rotation of the lens assembly up to 180 degrees with respect to the in use position.

7. Eyewear comprising:
   left and right side frame members configured to engage a wearer's head, said left and right side frame members engaging the wearer's head such that they pass between the wearer's ears and the wearer's head;
   left and right lens assemblies retractably attached to the respective left and right side frame members and each having a central portion releasably connected to each other to form a nose bridge; and
   a left retraction mechanism integrated into the left side frame member and coupling the left lens assembly to the left side frame member;
   a right retraction mechanism integrated into the right side frame member and coupling the right lens assembly to the right side frame member;
   said retraction mechanisms being configured to enable the left and right lens assemblies to be independently and slidably retracted along an exterior surface of the left and right side frame members from an in use position to a stowed position on the side of the wearer's head when separated at the releasable connection forming the nose bridge.

8. The eyewear according to claim 7, wherein said left and right retraction mechanisms each comprise:
   a connecting member fixedly attached to the lens and having an opposing end;
   a sliding element pivotally attached at one end to the opposing end of the connecting member and having a distal end;
   a longitudinal slot formed in the side frame member and being configured to receive the distal end of the sliding element which is configured such that said distal end cannot be withdrawn from the slot.

9. The eyewear of claim 7, further comprising a rear frame member connecting the left side and right side frame members such that the eyewear completely surrounds a wearer's head when in the worn in the user position.

10. The eyewear of claim 9, wherein the rear frame member further comprises
    a connection member having a weight configured to balance the eyewear on the users head, particularly when the lenses are in the stowed position; and
    a spring system configured to enable the user to flex the connected left and right side frame members outward and then inward thereby enabling the wearer to adorn the eyewear by wrapping the same around their head and connecting them at the point of the nose bridge.

11. The eyewear of claim 7, wherein said left and right retraction mechanisms each comprise:
    a pivot connection between the lens assembly and the connected frame member;
    a pivot guide configures into the frame member; and
    a pivot pin disposed on the frame assembly and configured to ride along the pivot guide so as to enable the rotation of the frame assembly about the pivot connection.

12. The eyewear of claim 11, wherein the pivot guide enables the rotation of the lens assembly up to 180 degrees with respect to the in use position.

13. The eyewear of claim 1, wherein said side frame members further pass behind the wearer's ears.

14. The eyewear of claim 11, wherein said left and right side frame members further pass behind the wearer's ears.

* * * * *